United States Patent Office 3,069,265
Patented Dec. 18, 1962

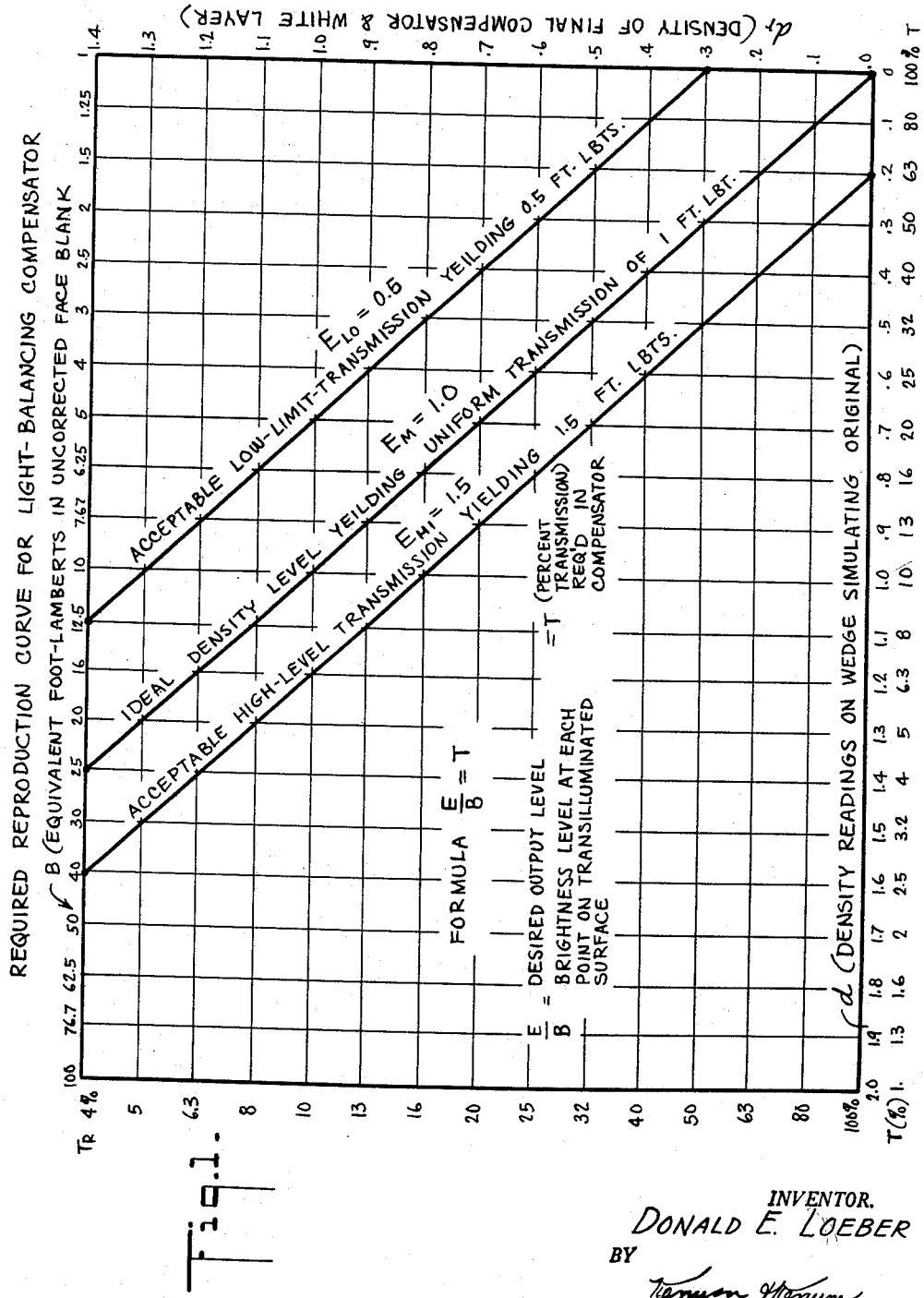

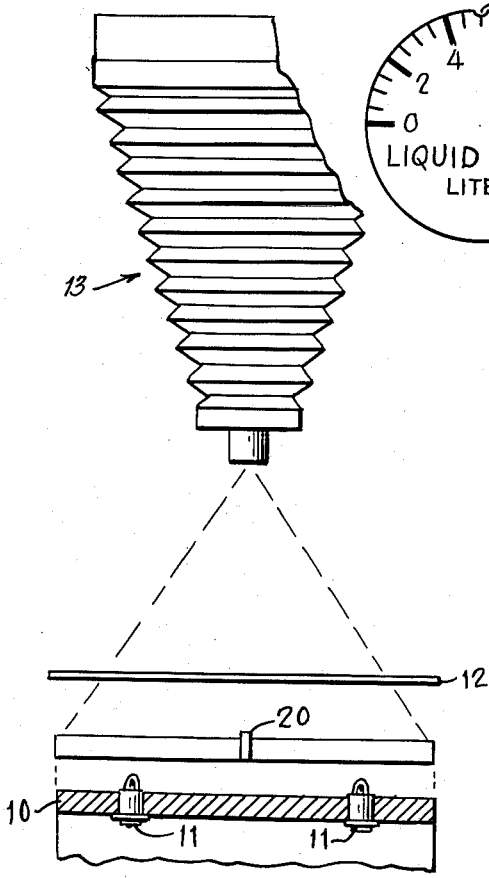
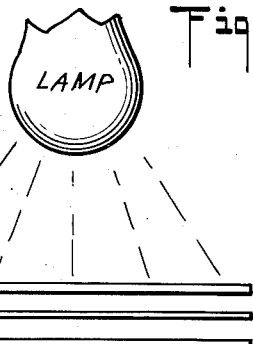
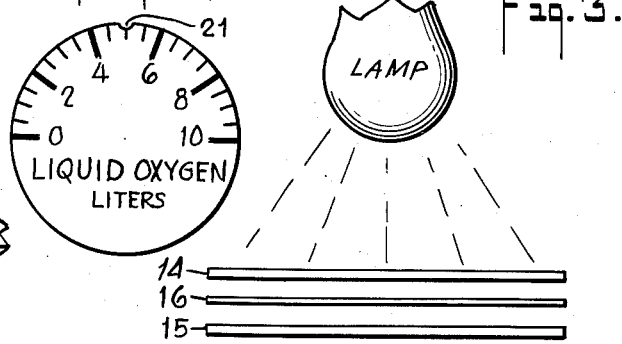
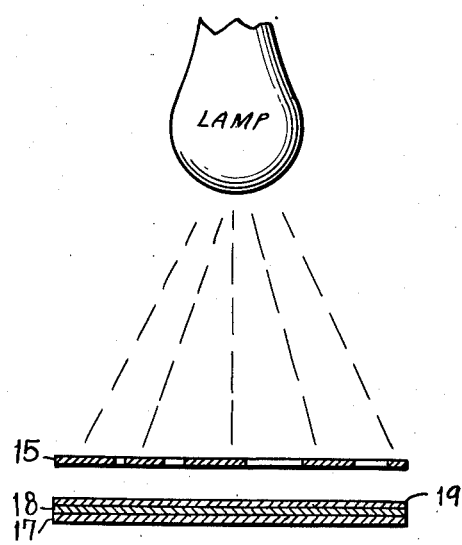
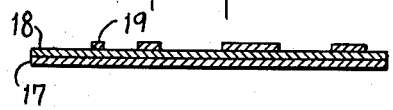
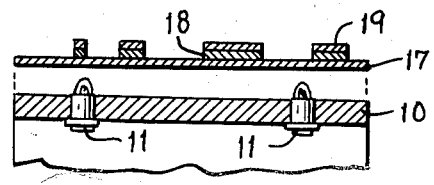

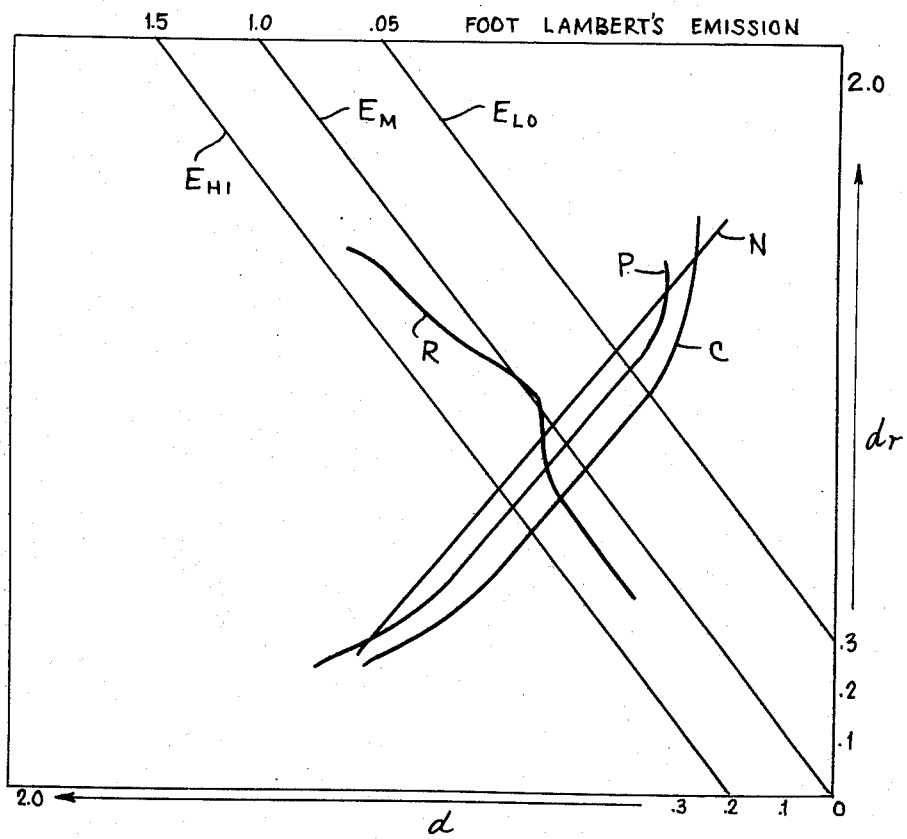

3,069,265
METHOD FOR PHOTOGRAPHICALLY PRODUCING LIGHT BALANCED DIAL INDICATORS
Donald E. Loeber, Closter, N.J., assignor to Simmonds Aerocessories, Inc., Tarrytown, N.Y., a corporation of New York
Filed Mar. 11, 1959, Ser. No. 798,637
4 Claims. (Cl. 96—35)

This invention relates to illuminated devices and more particularly to a method for producing an improved light balancing compensator.

There are many devices which use integral or "back lighting" to illuminate a transparent plastic or glass member. The most common instances of this type of device are the faces of instruments and signs.

One of the most common objections to the integral or "back lighting" techniques employed in the past is that the areas of illumination are uneven in that the same amount of light is not transmitted throughout the face of the instrument and, thus there are areas removed from the light source which are consequently dimmer than those which are near the light source.

In the case of aircraft instruments and the like, this condition of uneven light transmission is extremely dangerous in that it makes it difficult to read accurately the instruments during darkness. This is because in the usual aircraft instrument a single lamp or pair of incandescent lamps must be placed quite close to the instrument face. Without some type of light balancing means the result is unsatisfactory lighting of the instrument face.

There have been many attempts to overcome the disadvantages of this procedure. One such method has been to provide an exact sized photographic negative which has been taken of the illuminated area and which is affixed to the instrument face. The negative, inasmuch as it reverses the effect of the light source, acts as a light balancing mediator by absorbing the light in amounts varying over the range of the tone of the negative to balance out the unevenness of light transmission therethrough. While certain applications of the photographic negative type of light balancing compensators are satisfactory, if high temperatures are to be encountered, such as those present in an aircraft instrument or other instruments where the light source is relatively near to the face of the instrument, this method is unsatisfactory. This is due to the inability of the negative to withstand the temperatures encountered which cause it to crack, peel or otherwise disintegrate and become ineffective. A further disadvantage of this method is that one such negative must be produced for each one of the instruments or panels to which they are affixed. Thus, this method is expensive, requires skilled help, and if high temperatures are to be involved, it is unsatisfactory.

Another method of balancing the brightness level of an instrument face or panel has been to provide varying thicknesses or patterns of a translucent paint or ink which again absorb the light in varying amounts to balance out the effective transmission of light by the instrument face or panel. Such paints and inks employed in this type of compensator tend to have poor resolution in that the scale of gradation is only about 5:1 for paints and about 8:1 for inks. This method is generally unsatisfactory because of the extreme difficulty of reproducing the results within any acceptable range, and in addition requires the use of highly skilled persons who balance the brightness level by the trial and error method.

Accordingly it is an object of this invention to provide an improved method of correcting irregularities of an instrument or panel which is illuminated from a restricted number of light sources.

Another object is to provide a light balancing compensator which has a greater scale of gradation than was possible heretofore when paints or inks were employed.

Another object is to provide a simple, reproducible method suitable for the mass production of illuminated instruments or panels having a substantially constant light transmission over their entire illuminated surface.

A further object is to provide indicia bearing members, such as an instrument face or panel, which is illuminated from a restricted number of light sources, and which has integral means to distribute evenly the illumination over the entire face of the member.

A further object is to provide a novel means for balancing the brightness level of a translucent indicia bearing element which is illuminated by a restricted number of light sources and which will withstand high temperature conditions.

Another object is to provide a translucent instrument face or panel with a light balancing compensator which has highly reflective portions which increase the illuminative efficiency of a light source or sources used therewith.

In brief, the light balancing compensator means of this invention is preferably made by the following steps. An exact sized photographic negative of the area of illumination to be corrected is taken through a diffusion filter. This prevents "hot spots" caused by the light source or sources from being reproduced on the negative. The constant tone negative produced is truly representative of the area illuminated by the light source or sources to be reproduced.

A transparent positive is then made from the negative through a half-tone screen in order to maintain the gradation of light transmission by the light source or sources, which was recorded by the negative.

The next step is to contact print the positive onto the face of a transparent member which is covered by a thin opaque film of a reflective substance such as silver or aluminum, and which film is then coated with a photo-sensitive emulsion. The result of the contact print on the photo-sensitive material is to harden the emulsion in areas where the light is transmitted, and to leave soft those areas which are not exposed because of the dark areas of the positive. The emulsion is developed and washed so as to leave unprotected the opaque film which was beneath those portions of the emulsion which were unexposed during the contact printing of the positive thereon.

The final step is to etch the opaque film with a material which removes the unprotected portions thereof, but which leaves intact the protected portions.

The above is a simple, easily reproduced method capable of being performed by average skilled persons and results in the production of an inexpensive light balancing compensator means of greater accuracy than was possible heretofore. The method is easily adaptable to mass production of light transmission balanced instrument faces or panels.

Other objects, features, and advantages of this invention will become more apparent after a consideration of the detailed description which follows when taken in conjunction with accompanying drawings in which:

FIG. 1 is a graph illustrating the design parameters taken into consideration in order to produce the light balancing compensator of this invention;

FIG. 2 is a schematic illustration of the first step of the method of this invention;

FIG. 3 is a schematic illustration of the second step of the method of this invention;

FIG. 4 is a schematic illustration of the third step of the method of this invention;

FIG. 5 is an exaggerated cross-sectional view of an instrument face produced by the method of this application prior to etching;

FIG. 6 is an exaggerated cross-sectional schematic view of a light balance compensated instrument face blank produced in accordance with the method of this invention;

FIG. 7 is a top view of an instrument face of the type in which the light balancing compensator of this invention is employed; and FIG. 8 is a portion of the graph shown in FIG. 1 illustrating typical reproduction curves of the elements employed in practicing this invention.

In the descriptions which follow below, the method of this invention will be described in terms of producing a light balancing compensator for an integrally illuminated instrument face of the type shown in FIG. 7, which is one of the instruments normally found in aircraft. Space requirements within such an instrument normally dictate that the light source will be relatively close to the face of the instrument.

Assuming a condition where the transmission of the light through the normal thin layer of translucent white paint on an uncorrected instrument face may vary in value from 1 to 20 foot lamberts, and that it is desirable to provide a means for correcting the irregularities of transmission to a range of from .5 to 1.5 foot lamberts, with the ideal falling at 1.0 foot lamberts, it will be necessary to provide for a light balancing compensator of varying opacity sufficient to correct the transmission of light through the instrument face so that it falls within the acceptable range. Thus the light balanced, corrected instrument face should yield proportional density reproduction or in other words, the light balancing compensator means should be capable of photo-mechanically controlling the transmission of light so that all points in the illuminated area can be made to emit, within a narrowly limited range, substantially the same level of illumination brightness.

In FIG. 1 the range of transmission in foot lamberts at all points on an illuminated surface to be controlled by a light balancing compensator may be plotted against the required density of opacity of a compensator which will produce an overall range of transmission which does not fall outside of the 0.5 to 1.5 foot lamberts range. Thus for any point on an uncorrected illuminated surface a value of the required density or opacity of the compensator and the percent of incident light which is transmitted through it may be obtained. The range selected for the acceptable transmission by a compensator is arbitrary and any desired range may be plotted in terms of density and transmission.

The required transmission of a suitable compensator is governed by the formula:

$$\frac{E}{B}=T \qquad (1)$$

E is the desired output emission level;
B is the brightness level at each point on the illuminated area; and
T is the transmission of the compensator or varying density control media used to achieve proper brightness.

E is pre-selected and can be set at any value or range which will give satisfactory lighting. B is a measured quantity which is determined by brightness meter readings of the uncorrected illuminated surface. T is the percent of total incident light to be transmitted by the compensator so as to make B fall within the range $E_{low}$ to $E_{hi}$. The format of the graph shown in FIG. 1 will be recognized by those skilled in the photographic arts as a typical $d \log E$ or log exposure chart. The scales shown on FIG. 1 are based on density $(d)$ readings as made on a densitometer or photographic analyzer through a translucent photographic image. The term "$d$" is related to the term "$T$" by the formula:

$$\text{Density}=d=\text{Log}\frac{1}{T} \qquad (2)$$

The B scale at the top of FIG. 1 represents a selected range of brightness values which include the range encountered in a transilluminated uncorrected instrument face. Since 1.0 foot lamberts is the minimum which should be encountered in the type of instrument employed herein a value of "$T$"=100% and "$d$"=0 will yield an "$E$" of 1.0. To derive the remainder of the "B" scale use the formula:

$$\text{Mean brightness level } B_m = \frac{E_m}{T} \qquad (3)$$

$$\text{High limit brightness level } B_{hi} = \frac{E_{hi}}{T} \qquad (4)$$

$$\text{Low limit brightness level } B_{lo} = \frac{E_{lo}}{T} \qquad (5)$$

The value of the term $d_r$ is of course given by the formula:

$$\text{Reproduction density } dr = \text{Log}\frac{1}{T_r} \qquad (6)$$

where $T_r$ is the resulting percent of transmission through a completed compensator or the separate steps thereof. In order to predict the range of permissible values of $d_r$ for the completed compensator and hence the required parameters of the photographic materials and the photographic technique to be employed, it is necessary to plot the diagonal lines $E_m$, $E_{lo}$ and $E_{hi}$. The plot of the formulae:

Mean Emission Level $$E_m = T_r B_m \qquad (7)$$

High Limit Emission $$E_{hi} = T_r B_{hi} \qquad (8)$$

Low Limit Emission $$E_{lo} = T_r B_{lo} \qquad (9)$$

on FIG. 1 will be the diagonal lines $E_m$, $E_{hi}$, and $E_{lo}$. An examination of the graph in FIG. 1 shows that in order to hold the resulting compensator within the narrow range of effective light transmission between $E_{lo}$ and $E_{hi}$ a very careful control of the values of $d_r$ at each point of the entire illumination area must be exercised.

The preferred method by which this is accomplished is illustrated in FIGS. 2, 3, 4, 5 and 6. In FIG. 2 instrument block 10, without the instrument face, is illuminated by its customary light source or sources 11. In practice the usual instrument block 10 is a translucent material, sometimes colored, which serves to diffuse and spread the light from light sources 11 throughout the entire instrument block 10. In some instruments an open space, surrounded by reflective surfaces may be utilized instead of a translucent solid body as a light reservoir or distributing means between the light sources and dial plate. A diffusion filter 12 is positioned between the surface of instrument block 10 and the lens of camera 13. The diffusion filter 12 should have an optical density substantially equivalent to the normal layer of translucent paint. Also its position with respect to the light sources 11 should be substantially the same as that which will be occupied by the normal layer of translucent paint applied to the completed instrument face.

Using a good quality panchromatic film, a 1:1 exposure is made so as to reproduce exactly the illuminated surface area of the instrument block 10. The film marketed under the name "Superpan Press B" by Eastman Kodak Company is satisfactory for this purpose. Orthochromatic film may be used, but since many instruments use red light sources, the panchromatic film is preferable.

The diffusion filter 12 serves to prevent the camera 13 from recording the light sources themselves and serves to perform the function of the usual while translucent material employed in such an instrument face as shown in FIG. 7 which makes possible the reading of the instrument without additional light during daylight hous.

The exposed film is then developed in a careful manner to produce a gamma 1.0 continuous tone negative 14. It will be appreciated that this negative 14 represents an exact sized true picture or representation, in reverse, of illuminated surface area of the instrument block 10.

Once the negative 14 have been produced the next step is to produce a positive 15 from the negative 14 through a half-tone screen 16. The purpose of the half-tone screen 16 is to maintain the gradations of light transmission onto the positive 15 as recorded by the continuous-tone negative 14. Although, as illustrated in FIG. 3, these elements are shown as being separated during the exposure, it is simplest to produce the positive 15 by a contact printing process in a vacuum-backed camera or exposure frame so as to insure intimate contact between negative 14, half-tone screen 16 and the positive 11 and hence the retention of the 1:1 size ratio.

The positive 11 is generally made from a super high contrast type of film. This is desirable since, as is fully explained below, in the final step it is essential that there be no light transmitted through those areas of the positive 15 which are exposed. The type of film is of the kind which is employed for standard lithographic work. In place of, and preferable to a separate half-tone screen 16, a film which has a built-in half-tone screen such as the 133 line "Kodalith Autoscreen Ortho" film manufactured by the Eastman Kodak Company may be employed.

The positive 15 produced will be a transparency which has "dots" of varying sizes depending on the pattern of light transmitted to the positive 15 through negative 14 and half-tone screen 16. Because of the high contrast film employed all such "dots" will be black and none will have any appreciable shades of gray. The gradations in the negative 14 will be preserved since the "dots," though their centers are all equidistant, will be of varying size and will produce a varying opacity ranging from roughly 10% (transparent) to 90% (opaque) of the openings of the half-tone screen 16 employed.

An instrument face blank 17 of a uniformly transparent or translucent glass or plastic material is prepared with a thin, molecular film 18 of an opaque material which has a dried coating of a light sensitive, acid resist- in emulsion 19. The opaque film 18 is preferably of a reflective substance, such as thin metallic films of silver or aluminum. The result of the opaque film coating process is preferably a near perfect mirror, which means that practically speaking no light can be transmitted through the instrument face blank 17, once the opaque film 18 has been applied thereto.

The emulsion 19 may be of the type as used in photoengraving such as that marketed under the name "Photoresist" by the Eastman Kodak Company. It may be applied in any suitable manner which insures a thin, even coating over the entire surface of the opaque film 18. One satisfactory method of insuring this is to place an excess on the surface of the opaque film 18 and spin the blank 17 at a high speed to throw off the excess and leave a thin even coating of emulsion 19, which is then heated or air dried as required.

The positive 15 is now contact printed onto the surface of emulsion 19 as shown in FIG. 4. In those areas of the emulsion 19 which lie directly beneath the "dots" of the positive 15 there will be no exposure during the contact printing step, since the "dots" are completely opaque. However, in those areas of the positive 15 where no "dots" interfere and therefore which transmit light, hardening of the emulsion 19 occurs. Then the instrument face 17, film 18, and emulsion 19 are placed in a development solution recommended for the particular light sensitive emulsion employed and washed with running water. After washing, the film 18 which is not beneath hardened portions of emulsion 19 will be unprotected. (See FIG. 5.)

The unprotected opaque film 18 may now be etched away by an etching solution. If silver is used to create the film 18, an acid solution of ammonium dichromate is used. When aluminum is used for the film 18, caustic solution of sodium hydroxide is used to etch away the unprotected aluminum. The hardened emulsion 19 which remains after its developing and washing must not be adversely affected by the etching solution. The result is that shown in FIG. 6, which shows in an exaggerated form the completed light balancing compensator.

The pattern of "dots" resulting from the contact printing of the positive 15 will be reproduced on the instrument face blank 17. This will result in a pattern of density or opacity of the instrument face blank which serves to balance out irregularities of light transmitted through the transparent portions and if the corrected instrument face blank were to be replaced on the instrument block 10 and brightness meter readings taken at any point, the readings would all fall within the specified narrow range.

The advantage of using a highly reflective material such as silver or aluminum for the opaque film 18 is that the "dots" remaining after the etching will reflect light back to the light source of instrument block 10, and materially increase the efficiency of the light sources 11. This is to be contrasted with previously used materials which absorbed the light and thus tended to decrease the efficiency of the light source.

The hardened photosensitive material remaining on the "dots" cannot affect the light transmission of the final product since the "dots" are completely opaque. However, the remaining hardened photosensitive material does act to prevent damage to the "dots" when the compensated instrument face blanks 17 are handled in the subsequent steps outlined below, when the indicia are placed on the instrument face blank.

Referring now to FIG. 8, N represents the density range of the continuous tone, gamma 1.0 negative. Since the representation of the illuminated area is exact, the line N is straight. Line P represents the density range of the half-tone screen positive, which, due to unavoidable and immaterial distortions, is a curved line when compared with the negative from which it was made. Line C represents the density range of the completed compensator as plotted against the positive from which it was made. It will be noted that its range is displaced from, but corresponds to, the shape of the line P. This occurs because of the difficulties entailed in exact linear reproduction of the positive 15 on the instrument face blank 17.

Foot lambert readings, taken at fourteen random points on an instrument face similar to that shown in FIG. 7 which had been light balance compensated by the above described method, produced the following readings:

*Range of Transmission of Compensator in Ft. Lamberts*
*(Readings From Typical Compensator)*

1.36
1.28
1.28
1.20
1.16
1.04
1.04
.96
1.04
1.04
1.24
1.28
1.28
1.28

It will be noted that they all fell well within the acceptable range of 0.5 to 1.5 foot lamberts. Note also that the line R in FIG. 8 (the plot of $d_r$ for the compensator against the $d$ values if the negative) falls close to the $D_m=1.0$ foot lamberts line.

Once the instrument face blank 17 has been light balanced it may then be subjected to standard techniques to apply the necessary indicia. This normally calls for the thin coating of a translucent white paint mentioned above, followed by a black coating applied in such a manner as to leave the scale markings, numbers and letters free of the black coating. This provides a daylight reading contrast for the instrument face. When illuminated by the standard white or colored lighting sources, the dial face will appear to have a practically constant level of brightness, ensuring that accurate readings over the entire scale can be made. Since the entire instrument face blank 17 was treated, regardless of the type of indicia employed and regardless of where they are placed, the effective transmission of light through the indicia will be substantially constant.

In order to ensure the accurate placement of the completed instrument face on instrument block 10, registering post 20 is commonly placed at the top dead center of the block 10. This will then appear on the negative 14 and will result in a spot on the half-tone screen positive 15. By matching the spot near the edge of the half-tone screen positive 15 with a registering notch 21 cut in the instrument face blank 17, the accurate placement of the completed instrument face on the block 10 will be ensured.

Many instrument faces may be prepared from a single positive. If a standard instrument block 10 of a particular configuration is employed for more than one type of instrument, then large numbers of properly compensated instrument face blanks may be produced from the one original positive. Later, the different indicia for each type of instrument may be placed on the face blanks.

Variation in the reading matter, indicia or graduation pattern on the instrument faces will not require creation of a new negative of the block. If, however, any substantial revisions in the shape, shadow pattern on transmission of the illuminated area are made, then a new negative and half-tone screen positive should be made.

Thus the method of this invention makes possible mass production techniques. In addition the method is simple to carry out and the need for highly skilled technicians is eliminated. Also the product is one which is easily reproducible and is superior to any produced by previous methods. The level of effective transmission or brightness of the completed instrument faces can be made substantially constant over any practical desired value range.

While this invention has been described in terms of certain defined types of materials and certain techniques, those skilled in the art can make many modifications in the materials or techniques without departing from the spirit of this invention and the scope of the appended claims.

I claim:

1. For an integrally illuminated instrument of the kind including (i) a face element of substantially plane aspect, (ii) a block element in spaced relation to said face element and having a plane surface adjacent said face element and substantially parallel thereto, and (iii) at least one substantially point-type source of illumination mounted on said block element and directed toward said face element, the method of producing a face element having light transmission characteristics adjusted to compensate for irregularities in illumination so that said face element has a substantially constant light transmission over the entire illuminated surface thereof, said method comprising the steps of (1) photographing said plane surface of said block element and said point-type source of illumination through a diffusion filter to produce a photographic negative of the area of illumination, said source of illumination being lit; (2) making a half-tone positive from said negative; (3) applying a film-like layer of opaque material to one broad surface of a piece of face element blank material, said blank material itself being a material permitting light rays to pass therethrough; (4) applying a layer of photosensitive material to said layer of opaque material; (5) exposing said layer of photosensitive material through said half-tone positive; (6) developing and washing said photosensitive material to leave unprotected those portions of said layer of opaque material previously positioned beneath unexposed portions of said layer of photosensitive material; (7) etching said layer of opaque material to remove only the unprotected portions thereof; (8) applying a thin layer of translucent white paint to said broad surface of said piece of face element blank material, and (9) applying a black coating over said layer of translucent white paint to cover all areas thereof except those constituting the indicia of said instrument face element, asid diffusion filter in step (1) being positioned with respect to said point-type source of illumination in approximately the same location as that to be occupied by said layer of translucent white paint upon assembly of said instrument.

2. The method of claim 1 in which said piece of face element blank material is transparent, and in which said area of illumination is photographed to produce a 1:1 continuous tone photographic negative.

3. The method of claim 1 in which said opaque material is metallic.

4. The method of claim 3 in which said instrument includes further a registering post positioned on the perimeter of said block element and is characterized by a registering notch in its piece of face element blank material, said post being photographed along with said area of illumination and appearing on said negative and said half-tone positive to provide means for aligning said positive with said notch in said piece of face element blank material.

References Cited in the file of this patent

UNITED STATES PATENTS

| | | |
|---|---|---|
| 1,525,531 | Bassist | Feb. 10, 1925 |
| 2,036,021 | Cheney | Mar. 31, 1936 |
| 2,269,161 | Morse | Jan. 6, 1942 |
| 2,681,980 | Harrington | June 22, 1954 |
| 2,735,763 | Heath | Feb. 21, 1956 |
| 2,830,899 | Brown | Apr. 15, 1958 |
| 2,858,417 | Stevens et al. | Oct. 28, 1958 |
| 2,914,405 | Consaul et al. | Nov. 24, 1959 |
| 2,997,392 | Consaul et al. | Aug. 22, 1961 |